Figure 3:
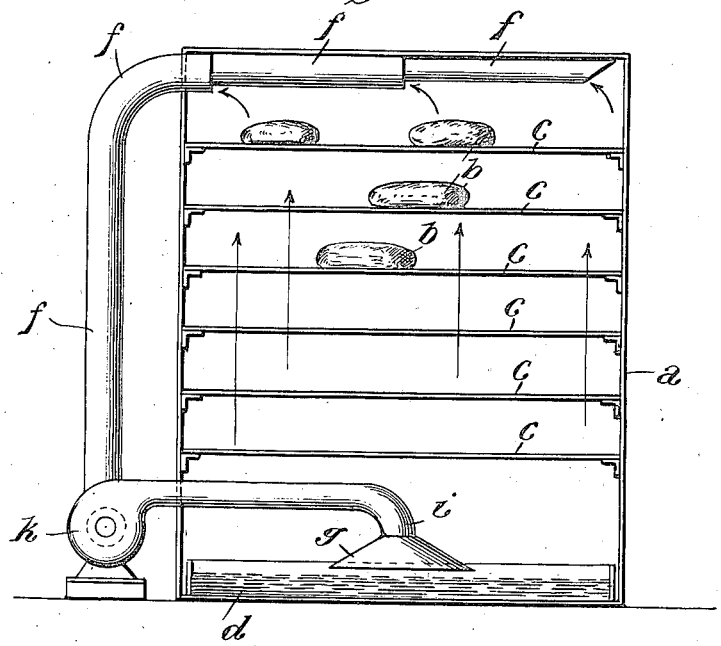

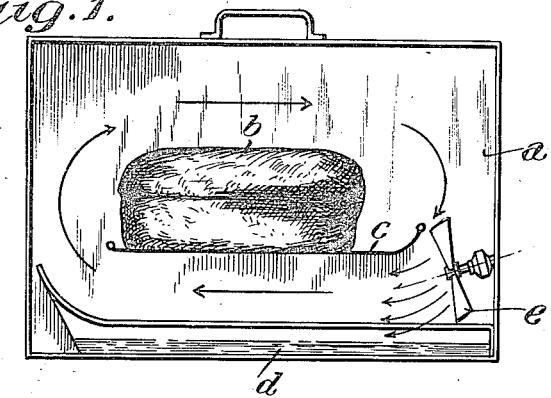
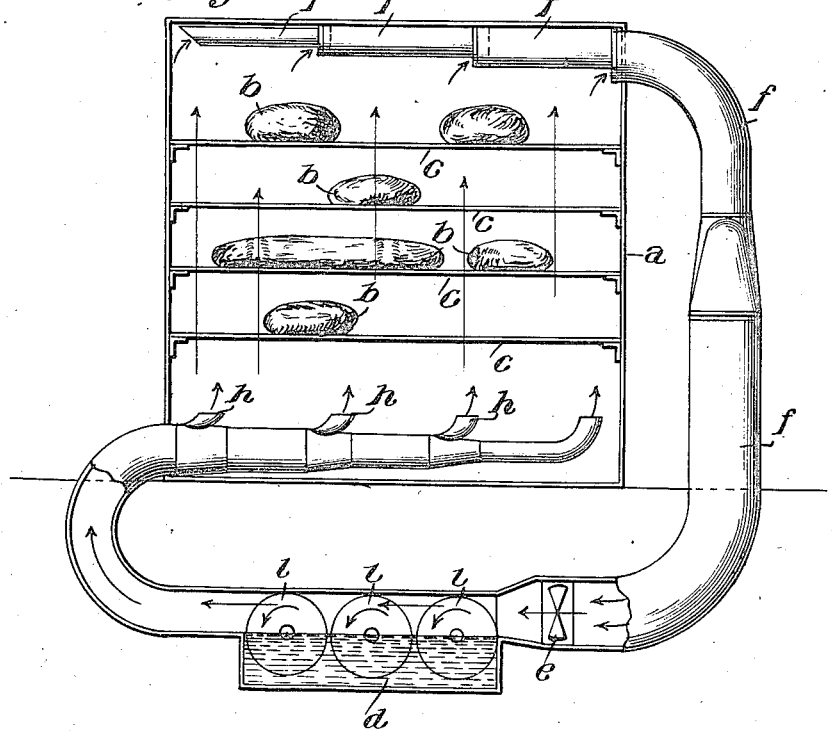

J. R. KATZ.
PROCESS FOR TREATING BREAD AND OTHER PASTRIES.
APPLICATION FILED MAY 29, 1914.

1,181,317.

Patented May 2, 1916.

2 SHEETS—SHEET 2.

Witnesses
Miriam Stern.
Dudley Browne.

Inventor
J. R. Katz.

By [signature]
Attorney

UNITED STATES PATENT OFFICE.

JOHAN RUDOLF KATZ, OF AMSTERDAM, NETHERLANDS.

PROCESS FOR TREATING BREAD AND OTHER PASTRIES.

1,181,317.  Specification of Letters Patent.  Patented May 2, 1916.

Application filed May 29, 1914. Serial No. 841,769.

*To all whom it may concern:*

Be it known that I, JOHAN RUDOLF KATZ, doctor of medicine, a subject of the Queen of the Netherlands, and residing at 233 Weteringschans, Amsterdam, in the Kingdom of the Netherlands, have invented certain new and useful Improvements in Processes for Treating Bread and other Pastries, of which the following is a full, clear, and exact description.

This invention relates to the treatment of bread and other pastries.

The whole bakery industry makes it a general practice to put in night work. This is due to the fact that there are no means, to make or keep pastry, which has been made the previous evening—especially when it is made of wheaten flour and fermented with yeast—in such a condition, that it still shows with security and to a sufficient degree the characteristics of fresh pastry the next morning. Even those countries where night work is legally forbidden, must allow partial night work, for example from 4 o'clock in the morning, so that fresh pastry can be had for breakfast. Limited working hours are unknown in the bakery-industry. It has been tried to limit the working hours during the night, by dividing the preparing of the pastry into two intervals, one of the previous evening and the other in the early morning.

The division of the working hours has been tried in the following manner: 1. By extending the fermentation of the paste over a very long period, about 8 to 10 hours or even more, which is obtained by adding the yeast or leaven in small quantities only. 2. The bread underwent an incomplete baking process on the previous day which was completed immediately before using the bread. 3. The fermenting process of the bread paste was artificially interrupted, by keeping the fermented paste at a low temperature (about 0° centigrade) till the baking started. All these processes however, have the great disadvantage, that they still make partial night work necessary as, in order to be able to furnish in the morning a pastry with a good taste, work must be started so early that there is not much difference between the necessary working hours and the working hours extending over half a night. Further, with this arrangement it can scarcely be avoided that the pastry has not such a nice taste. All these inconveniences are avoided in the present invention and all night work is avoided without imparting to the products an inferior taste.

It is the intention of this invention to submit the baked bread to such a treatment, that pastry which has been baked the previous evening still presents on the following morning the characteristics of freshly baked bread in such a degree that the public accepts it as such. For this purpose, the crust has to be protected as a first thing, as the crumb can be made in such a manner that it takes a long time to harden. This fact is very important for such countries, in which wheaten flour bread is eaten. These experiments have led to the present process which consists in that the crust of the baked bread is protected for a sufficient period against those alterations which cause its softening without influencing the natural course of development and the characteristics of the crumb.

The inventor has found that, when baked pastry (for example baked loaves) which contains within the crust with little moisture crumb with much moisture, is submitted to the influence of passing air currents containing a predetermined degree of moisture, there are two limits, the overstepping of which causes the smoothing of the crust on the one hand, and on the other hand a too strong drying of the part of the crumb, which is situated directly under it.

In most kinds of bread, the limit, when a smoothing of the crust sets in, is at 85% moisture in the air, whereas the limit, at which a drying of the bread in a perceivable disadvantageous measure starts, is about 65–55% moisture of the air, when the keeping lasts 15–18 hours. In pastries with a thick hard crust a somewhat drier air current can be employed without damage.

The process of treating bread consists in this invention in that the bread is subjected to the influence of moving air, which is given an appropriate velocity and which contains a medium percentage of moisture, which lies between the limits at which a smoothing of the crust or a too strong drying of the crumb starts. In most cases 75% of moisture has proved satisfactory.

For the necessity of guiding the air with a certain velocity over the bread, the applicant gives the following scientific explanation based on experiments carried out by him: The smoothing of the bread crust in a closed space is caused by two things, the absorption of water from a moist atmosphere, and through a continuous water diffusion from the crumb to the crust. This diffusion is due to the fact that the tension of the water vapor in the crust is very much more reduced than that of the crumb, which latter—protected by the crust—keeps the greater part of the water contained in the paste. The air current must therefore be given a sufficient velocity to carry away the moisture which continually penetrates from the crumb into the crust. A velocity of 6 meters per minute has proved satisfactory, when an air current of homogeneous 75% humidity is used, but evidently this velocity can be varied within wide limits.

The simplest form of carrying out the process is to use an air current the humidity of which must lie within the aforementioned limits; in order to maintain this humidity the air current is subjected to the influence of such bodies as in an appropriate manner, owing for example, to their physio-chemical properties, or by the use of mechanical, thermic or other means, regulate the tension of the water vapor. Such bodies are:

(a) Watery solutions of sulfuric acid, common salt, calcium chlorid, and other bodies which bring about a sufficient decrease of the vapor pressure of water. The use of saturated solutions of salt with a surplus of salt have sometimes proved satisfactory.

(b) Water of a temperature which is lower than that of the air current or other cold surfaces.

(c) Further, appropriately regulated quantities of steam can be added to the air current, to maintain the amount of moisture which is necessary.

(d) Further in order to regulate the vapor pressure or humidity of the air, appropriate or regulated quantities of air with differentiated amounts of moisture either in single streams or in a mixture of streams can be led into the air current and mixed with it, or the air may be led with a regulated velocity over a drying body.

(e) The liquid bodies which influence the vapor pressure of the water, can further be made to drop in the form of raindrops or to run along appropriate surfaces.

The air current can also be an intermittent one. The degree of dryness of the circulating air must then be higher, but so that the average humidity of the air which surrounds the breads has the abovementioned value.

For carrying out this process, special apparatus can be used, substantially as shown in the accompanying drawings in which:

Figure 1 shows an apparatus suitable for domestic purposes; Figs. 2 and 3 show two forms of execution which are suitable for bakeries.

The principle of the arrangement consists in that the air current of appropriate velocity is brought into contact with suitable bodies which influence the tension of the steam, such as common salt, or calcium chlorid solutions and that the thus influenced air current is made to act upon the finished pastry.

In the apparatus for domestic purposes as shown in Fig. 1, $a$ is the closed space, $b$ the pastry, which is placed on an appropriate frame work $c$ and $d$ is a vessel with the fluid for regulating the vapor pressure, $e$ is a suitable mechanical device for leading or sucking the atmospheric current through the apparatus. As an appropriate solution for the experiment, a saturated common salt solution with a solid salt surplus is proposed (suggested).

In Figs. 2 and 3 is shown diagrammatically a form of execution of the apparatus suitable for bakeries, in which $a$ designates the space for storing or placing the bread. A frame work $c$, $c$ made of wooden spars, iron or other metal rods (metal frame work) is shown, on which the pastry lies and which is surrounded by the air which is sucked or pressed through and which always has a constant amount of moisture. At $f$, $f$ suction devices for sucking in atmospheric air contained in the space $a$ are provided. The contact of the air with the watery solutions, which influence the former, can be brought about in different manners, for example by guiding the complete air currents, or part of them, over the surface of the watery solutions, or by guiding the air through them. At $f$, $f$ are shown tube pieces, consisting of two pipes arranged one inside of the other. The air is forced through the funnels to the salt solution in the pan $d$, from whence said air rises and is drawn through the open ends of the tubes $f$. The air is thus brought into direct contact with the salt and to cause an intimate mixture of the fluid. The tube pieces $f$, $f$ can be arranged at the end of series of tubes in any desired number and in any desired form.

In the arrangement shown in Fig. 3 the contact of the air with the solution is effected by passing the air which is sucked in at $f$ by means of a fan $k$ along a number of slowly rotating disks $i$ or other bodies moving to and fro by means of a fan $e$, which partially dip into the solution and thus increase the surface of contact between the solution and the air considerably. At $h$, $h$ are the openings through which the so treated air flows. At $k$ is shown a suction or pressing apparatus (exhauster, ventilator, or the like).

What I claim is:

The herein described method of treating pastry, comprising the supporting of the pastry to be treated in a closed receptacle, passing a current of air over a salt solution, projecting the air into said chamber in which the pastry is supported, and exhausting said air therefrom.

In testimony whereof I affix my signature.

JOHAN RUDOLF KATZ.